(12) United States Patent
Uchiyama et al.

(10) Patent No.: US 7,613,356 B2
(45) Date of Patent: Nov. 3, 2009

(54) POSITION AND ORIENTATION DETECTION METHOD AND APPARATUS

(75) Inventors: Shinji Uchiyama, Kanagawa (JP); Kiyohide Satoh, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 628 days.

(21) Appl. No.: 10/885,664

(22) Filed: Jul. 8, 2004

(65) Prior Publication Data

US 2005/0008256 A1 Jan. 13, 2005

(30) Foreign Application Priority Data

Jul. 8, 2003 (JP) .............................. 2003-193633

(51) Int. Cl.
*G06K 9/38* (2006.01)
(52) U.S. Cl. .................... 382/271; 382/287; 345/633
(58) Field of Classification Search ................ 345/632, 345/633; 382/287, 309, 271, 293
See application file for complete search history.

(56) References Cited

U.S. PATENT DOCUMENTS

| | | | |
|---|---|---|---|
| 6,151,028 A | 11/2000 | Kumagai et al. ............ 345/427 |
| 6,400,362 B1 | 6/2002 | Uchiyama et al. .......... 346/420 |
| 6,516,099 B1 * | 2/2003 | Davison et al. ............. 382/284 |
| 6,765,569 B2 * | 7/2004 | Neumann et al. ........... 345/419 |
| 6,834,250 B2 | 12/2004 | Uchiyama et al. .......... 702/150 |
| 6,993,450 B2 * | 1/2006 | Takemoto et al. .......... 702/153 |
| 7,123,388 B2 * | 10/2006 | Ichihashi ..................... 358/483 |
| 2002/0191862 A1 | 12/2002 | Neumann et al. ........... 382/284 |
| 2003/0012410 A1 | 1/2003 | Navad et al. ................ 382/103 |
| 2003/0080976 A1 | 5/2003 | Satoh et al. ................. 345/629 |
| 2003/0144813 A1 | 7/2003 | Takemoto et al. .......... 702/153 |

(Continued)

FOREIGN PATENT DOCUMENTS

JP 11-84307 A 3/1999

(Continued)

OTHER PUBLICATIONS

Chai et al. ,An Adaptive Estimator for Registration in Augmented Reality, Oct. 20-21, 1999, 2nd IEEE and ACM International Workshop on Augmented Reality, 1999,pp. 23-32.*

(Continued)

*Primary Examiner*—Matthew C Bella
*Assistant Examiner*—Dennis Rosario
(74) *Attorney, Agent, or Firm*—Fitzpatrick, Cella, Harper & Scinto

(57) ABSTRACT

The present invention provides a method and apparatus for inputting a signal indicating a change in position of an image sensing apparatus to predict present position and orientation of the image sensing apparatus using previously obtained position and orientation, by identifying corresponding pairs of indicators detected from an image in real space sensed by the image sensing apparatus and indicators contained in an image when sensed from a predicted position and orientation and using a correction method determined by the number of identified indicator pairs either to correct all or some of the degrees of freedom of the predicted camera position and orientation or to use the predicted camera position and orientation directly as is. As a result, highly accurate detection results can be obtained using a simple structure in the detection of the position and orientation of the image sensing apparatus.

6 Claims, 4 Drawing Sheets

U.S. PATENT DOCUMENTS

| | | | |
|---|---|---|---|
| 2003/0182072 A1 | 9/2003 | Satoh et al. | 702/95 |
| 2004/0133379 A1 | 7/2004 | Kobayashi et al. | 702/127 |
| 2004/0176925 A1 | 9/2004 | Satoh et al. | 702/150 |

FOREIGN PATENT DOCUMENTS

| | | |
|---|---|---|
| JP | 2000-41173 | 2/2000 |
| JP | 2000-41173 A | 2/2000 |
| JP | 2000-121364 | 4/2000 |
| JP | 2000-347128 | 12/2000 |
| JP | 2000-354230 A | 12/2000 |
| JP | 2002-228442 | 8/2002 |
| JP | 2002-230586 A | 8/2002 |
| JP | 2002-258944 | 9/2002 |
| JP | 2002-371780 | 12/2002 |

OTHER PUBLICATIONS

Japanese Official Communication dated Feb. 29, 2008, regarding Japanese Patent Application No. 2007-25664.

Uchiyama, S. et al., "MR Platform: A Basic Body on Which Mixed Reality Applications are Built", Proceedings of the International Symposium on Mixed and Augmented Reality (ISMAR '02), nine sheets.

Janin A. et al., "Calibration of Head-Mounted Displays of Augmented Reality Applications", Proceedings of the Virtual Reality Annual International Symposium, Seattle, Sep. 18-22, 1993, pp. 246-255.

Quan L. et al., "Linear N-Point Camera Pose Determination", IEEE Transactions on Pattern Analysis and Machine Intelligence, vol. 21, No. 8, Aug. 1999, pp. 774-780.

European Communication and Search Report dated May 16, 2008, regarding Application No. 04254058.3-1224.

Hoff, W.A., et al., "Computer Vision-Based Registration Techniques for Augmented Reality", Proc. SPIE, vol. 2904, pp. 538-548, Nov. 1996.

Neumann, U., et al., "A Self-Tracking Augmented Reality System", Proc. VRST '96, pp. 109-115, Jul. 1996.

Rekimoto, J., "Augmented Reality Using the 2D Matrix Code," Interactive Systems and Software IV, Kindaikagakusha, pp. 199-208, Dec. 1996.

You, S., et al., "Hybrid Inertial and Vision Tracking for Augmented Reality Registration", Proc. IEEE Virtual Reality '99, pp. 260-267, Mar. 1999.

Fujii, K., et al., "A Registration Method Using Stereo Cameras with an Inertial Sensor for Augmented Reality", Shingaku Gihou, PRMU99-192, Jan. 2000.

Yokokohji, S., et al., "A Method of Position Tracking for a Head Mounted Display with Visual Tracking and Acceleration Measurement", The Virtual Reality Society of Japan, Journal of The $2^{nd}$ Annual Conference, pp. 121-124, Sep. 1997.

Chai, L., et al., "An Adaptive Estimator for Registration in Augmented Reality", The Virtual Reality Society of Japan, Journal of The $2^{nd}$ Annual Conference, pp. 23-32, Oct 1999.

You, S., et al., "Fusion of Vision and Gyro Tracking for Robust Augmented Reality Registration", Proc. IEEE Virtual Reality 2001, pp. 71-78, Mar. 2001.

Yokokohji, Y., et al., "Accurate Image Overlay on Head-Mounted Display Using Vision and Accelerometers", The Journal of the Virtual Reality Society of Japan, vol. 4, pp. 589-598, 1999.

Japanese Official Communication dated Aug. 20, 2007, regarding Japanese Patent Application No. 2003-193633.

* cited by examiner

POSITION AND ORIENTATION DETECTION METHOD AND APPARATUS

CLAIM OF PRIORITY

This application claims priority from Japanese Patent Application No. 2003-193633 filed on Jul. 8, 2003, the entire contents of which are incorporated herein by reference.

FIELD OF THE INVENTION

The present invention relates to position and orientation detection technique for detecting a position and orientation of an image sensing apparatus equipped with an image sensor for sensing images in real space and an orientation change detector for detecting the extent of a change in orientation.

BACKGROUND OF THE INVENTION

Detection of the position and orientation of an image sensing unit such as a camera that senses images in real space (hereinafter for convenience called simply "camera") is necessary to a mixed reality system that combines real space and virtual space and displays combined space (hereinafter "mixed reality space").

As disclosed as conventional art in, for example, Japanese Laid-Open Patent Publication No. 11-084307 (publication no. 1), Japanese Laid-Open Patent Publication No. 2000-041173 (publication no. 2), Japanese Laid-Open Patent Application No. 2000-354230 (publication no. 3) and Japanese Laid-Open Patent Publication No. 2002-230586 (publication no. 4), as a method of obtaining the position and orientation of such a camera there is a method of detecting the position and orientation of the camera by a position and orientation sensor such as a magnetic sensor, without using the sensed image of the camera (hereinafter called "method 1").

The inventions described in the foregoing publication nos. 1, 2 and 3 focus on the problem of the inability to obtain adequate accuracy with method 1. In addition to method 1, a method of correcting detection errors of the position and orientation sensor that detects those of the camera using markers whose positions disposed in real space are known or characteristic features whose position in real space are known (hereinafter markers and characteristic features are collectively referred to as "indicators") is disclosed. The methods disclosed in publications 1-3, although employing different detection principles as well as means and processes, are alike insofar as they obtain the position and orientation of the camera based on data obtained from a 6-DOF (degree of freedom) position and orientation sensor for detecting the position and orientation of the camera, data concerning points whose positions in real space are known and data concerning these points acquired by the camera. Hereinafter, these methods are collectively referred to as method 2.

Moreover, as disclosed in, for example, W. A. Hoff and K. Nguyen, "Computer Vision-based Registration Techniques for Augmented Reality," *Proc. SPIE*, vol. 2904, pp. 538-548, November 1996, U. Neumann and Y Cho, "A Self-tracking Augmented Reality System", *Proc. VRST* '96, pp. 109-115, July 1996, Rekimoto Junichi, "Techniques for Constructing an Augmented Reality System Using a 2-dimensional Matrix Code, *Interactive Systems and Software IV, Kindaikagakusha*, pp. 199-208, December 1996, many different methods of obtaining the position and orientation of the camera from just the information obtained by the camera sensing indicators that exist in real space (scene) with the camera are being implemented. These methods, which do not use sensors other than the camera, are hereinafter collectively referred to as method 3.

Method 3 is a method that detects the position and orientation of the camera solely by image processing, and thus suffers from an inability to track in cases that the position of the indicators change dramatically from one frame to the next, due, for example, to rapid movement of the head.

As a method of solving the foregoing problem with method 3, a method that uses a combination of sensors other than the camera has been proposed in S. You, U. Neumann, and R. Azuma, "Hybrid Inertial and Vision Tracking for Augmented Reality Registration", *Proc. IEEE Virtual Reality* '99, pp. 260-267, March 1999. This method, by predicting the coordinates of the indicator in the next frame from the coordinates of an indicator detected in the present frame and an angular speed obtained from a gyro sensor, improves intra-image indicator detection accuracy. Further, as an extension of the foregoing method, in Fujii, Kamihara, Iwasa and Takemura, "Positioning by Stereo Camera Using Gyro Sensors for Augmented Reality", *Shingaku Gihou, PRMU*99-192, January 2000, a method is proposed that improves upon the foregoing method by adding data obtained from the image data to the indicator coordinate prediction method. These methods, which predict the coordinates of the indicator by using sensors other than the camera, are hereinafter collectively called method 4.

Besides the foregoing methods, at the same time, as another method that uses inertial sensors such as gyro sensors, a method has been proposed involving the use of an extended Kalman filter. It is not a method that, like method 4, simply utilizes inertial sensors for prediction computation of the indicator in the next picture frame. Rather, this method is an attempt to install as input values the inertial sensor detection data directly into the extended Kalman filter that performs the camera position and orientation estimation computation (prediction computation). At the same time, the indicator image coordinate values are also input to the extended Kalman filter.

In other words, the method takes inertial sensor detection values and the position of coordinates detected from the image as the source of data input, directly applies such data to the extended Kalman filter, and predictively estimates the present position and orientation of the camera (since the position of the indicator obtained from the inertial sensors and the image is data obtained previously using the present camera position and orientation as the reference standard, an estimate of the present position and orientation can be obtained predictively). This method, by using sensor detection data obtained continuously without a break over a continuous period of time at precisely determined intervals as well as indicator data detected from the image to predict the continuous movement of the camera, estimates the position and orientation of the camera. As this method, a method of estimating the position and orientation of the camera has been proposed in Yokokouji, Sugawara and Yoshida, "Position Tracking Technique Using Vision and Angular Speed for a Head-Mounted Display," *The Virtual Reality Society of Japan, Journal of The 2nd Annual Conference*, pp. 121-124, September 1997 that involves combining six acceleration sensors and obtaining translational acceleration along three axes and rotation angle acceleration along three axes, and using these values as inputs to the extended Kalman filter to estimate the position and orientation of the camera. Moreover, in L. Chai, K. Nguyen, B. Hoff, and T. Vincent, "An Adaptive Estimator for Registration in Augmented Reality", *ibid*, pp. 23-32, October 1999, and S. You and U. Neumann, "Fusion of Vision and Gyro Tracking for Robust Augmented Reality Registration", *Proc. IEEE Virtual Reality* 2001, pp. 71-78, March 2001 as well, a technique using gyro sensors and an extended Kalman filter is proposed. Such methods, involving use of gyro sensors and an extended Kalman filter, are hereinafter collectively called method 5.

As described above, broadly speaking, there have been methods 1 through 5 as conventional arts.

Method 1, as has been made problematic already in method 2, using only a 6-DOF sensor gives rise to the problem that the accuracy of the position and orientation obtained is inadequate. Moreover, a 6-DOF sensor generally requires a separate apparatus mounted in real space (excluding the camera) for outputting signals for detection by the sensor unit mounted on the camera. For example, in the case of a magnetic type 6-DOF sensor, an apparatus that generates a magnetic field for detection by a sensor mounted on the detection target corresponds to this separate apparatus, and in the case of an optical type of sensor, a photoreceptor or photo-generator unit corresponds to this separate apparatus. That such a separate apparatus is required means that the detection range of the sensor is restricted to a limited range. In addition, there is the problem that, depending on the installation site, it might be difficult to install the separate apparatus itself, or, if installation is possible, it might be inconvenient. Further, there is the problem that the sensor itself remains generally expensive.

Method 2 is a method proposed in light of the drawbacks of method 1, in particular the inability to obtain adequate detection accuracy, and solves the problem of poor detection accuracy. However, insofar as the method uses a 6-DOF sensor, the problems of detection range, installation and cost remain unresolved.

For method 3, because it does not use a 6-DOF sensor, in principle the problems of limited detection range., installation or cost do not exist. In addition, if indicators whose positions in real space are known can be observed by a sufficient number of cameras, the position and orientation detection accuracy is also adequate. However, once any one of the indicators can no longer be observed from the camera, method 3 is totally unable to obtain the position and orientation of the camera. As a result, it is necessary to maintain a necessary and sufficient number of indicators in view at all times, from all positions and from all orientations through which the camera can move. In other words, a very large number of indicators must be disposed in real space, or the positions of the indicators in three dimensions must be input by some method, and therein lies the problem.

Further, when detecting the indicators from the image, in some instances there might be a problem with the detectional stability of the indicators. To be specific, in order to stabilize the detection of the indicators, each indicator must be large enough to enable that particular indictor to be identified and defined on its own, and moreover, that indicator must occupy a sufficiently large surface area within the image acquired by the camera. However, such a large indicator cannot always be installed in real space. As a result, situations arise in which, instead of using a large indicator, for example, a small indicator must necessarily be used, so that the indicator cannot be identified in isolation. In this case, for example, if there is a sudden rapid movement of the camera, the possibility that the indicator will fail to be detected increases.

Method 4 was conceived in light of the indicator detection stability problem of method 3. However, with method 4, prior to indicator detection from the image a gyro sensor is used solely for the purpose of predicting the position of the indicator, and with respect to everything else besides increasing indicator detection stability, method 4 retains the same problems that plague method 3. It should be noted that, in method 4, data obtained by the gyro sensor is not used in the computations used to estimate the position and orientation of the camera, and thus method 4 is the same as method 3 with respect to the computations performed to estimate the position and orientation of the camera. An inertial sensor such as a gyro sensor does not required a separate apparatus that must be disposed within real space, and therefore method 4 escapes the problems of detection range and installation that affect methods 1 and 2. In addition, because of its low cost in general, method 4 also solves the problem of cost associated with method 1 and method 2.

Method 5, unlike methods 1 through 4 described above, estimates the position and orientation of the camera continuously, without interruption, at precise intervals over a continuous period of time. With method 5, it is necessary to acquire data continuously at a certain interval, and moreover, it is necessary to estimate continuously at a certain interval. However, considering a case of adapting acquired position and orientation to a mixed reality system, because a process of uncertain required time, i.e., virtual space rendering is included in the processing, the position and orientation of the camera at the time a rendering is completed cannot be predicted when computations are performed using the extended Kalman filter, and thus does not always function effectively. Moreover, for the same reason, it is sometimes difficult in itself to perform estimation computations at precise intervals. As a result, it is difficult to apply method 5 to a mixed reality system in the first place, and even if applied the correct computation results cannot be expected.

In addition, the construction of the extended Kalman filter and the adjustment of parameters to the usage situation are delicate operations, and therefore it is difficult to implement settings that provide a desired operation. In the event that desired operation cannot be achieved, a problem that cannot arise with methods 1 through 3 (all of which use only data at one particular moment) does arise here, that is, a phenomenon in which the position and orientation detection results waver over time (with the result that the accuracy of the position and orientation detection is poor, insofar as, when looking at any given moment in time, the indicator positions in the image at that moment do not match up). It should be noted that this type of problem with method 5 does not arise with method 4 because method 4 uses a limited form in which the gyro sensor detection results are estimates of the detection region of the indicators, and thus method 4 is basically the same as methods 1 through 3.

SUMMARY OF THE INVENTION

The present invention is conceived in consideration of the above-described conventional art, and has as its object to obtain high-accuracy detection results using a simplified configuration in position and orientation detection.

To realize the object, according to an aspect of the present invention, position and orientation detection method of detecting a position and orientation of an image sensing apparatus that senses real space, the method comprising: an orientation change detection step of detecting an extent of change in orientation of the image sensing apparatus; a first image coordinates computation step of obtaining coordinates in an image of indicators included in a real space image sensed by the image sensing apparatus; a position and orientation estimation step of estimating a present position and orientation of the image sensing apparatus based on position and orientation of the image sensing apparatus obtained previously and the extent of change in orientation of the image sensing apparatus obtained in the orientation change detection step; a second image coordinates computation step of obtaining coordinates of indicators in a sensed image display screen of the image sensing apparatus at the position and orientation obtained in the position and orientation estimation step; and a position and orientation correction step of correcting the position and orientation estimated in the position and orientation estimation step using a correction method adapted to the amount of data obtained from the coordinates of the indicators obtained in the first image coordinates computation step and the coordinates of the indicators obtained in the second image coordinates computation step.

The above-described object is also realized by a position and orientation detection apparatus for detecting a position and orientation of an image sensing apparatus that senses real space, the apparatus comprising: an orientation change detection unit adapted to detect an extent of change in orientation of the image sensing apparatus; a first image coordinates computation unit adapted to obtain coordinates in an image of indicators includes in a real space image sensed by the image sensing apparatus; a position and orientation estimation unit adapted to estimate a present position and orientation of the image sensing apparatus based on position and orientation of the image sensing apparatus obtained previously and the extent of change in orientation of the image sensing apparatus obtained by the orientation change detection unit; a second image coordinates computation unit adapted to obtain coordinates of indicators in a sensed image display screen of the image sensing apparatus at the position and orientation obtained by the position and orientation estimation unit; and a position and orientation correction unit adapted to correct the position and orientation estimated by the position and orientation estimation unit using a correction method adapted to the amount of data obtained from the coordinates of the indicators obtained by the first image coordinates computation unit and the coordinates of the indicators obtained by the second image coordinates computation unit.

To realize the object, according to another aspect of the present invention, a position and orientation detection method of detecting a position and orientation of an image sensing apparatus that senses real space, the method comprising: an orientation change detection step of detecting an extent of change in orientation of the image sensing apparatus; a first image coordinates computation step of obtaining coordinates in an image of indicators included in a real space image sensed by the image sensing apparatus; a position and orientation estimation step of estimating a present position and orientation of the image sensing apparatus based on position and orientation of the image sensing apparatus obtained previously and the extent of change in orientation of the image sensing apparatus obtained in the orientation change detection step; a second image coordinates computation step of obtaining coordinates of indicators in a sensed image display screen of the image sensing apparatus at the position and orientation obtained in the position and orientation estimation step; and a position and orientation computation step of computing a present position and orientation from the coordinates of the indicators obtained in the first image coordinates computation step and the coordinates of the indicators obtained in the second image coordinates computation step.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

(First Embodiment)

Figure 1:
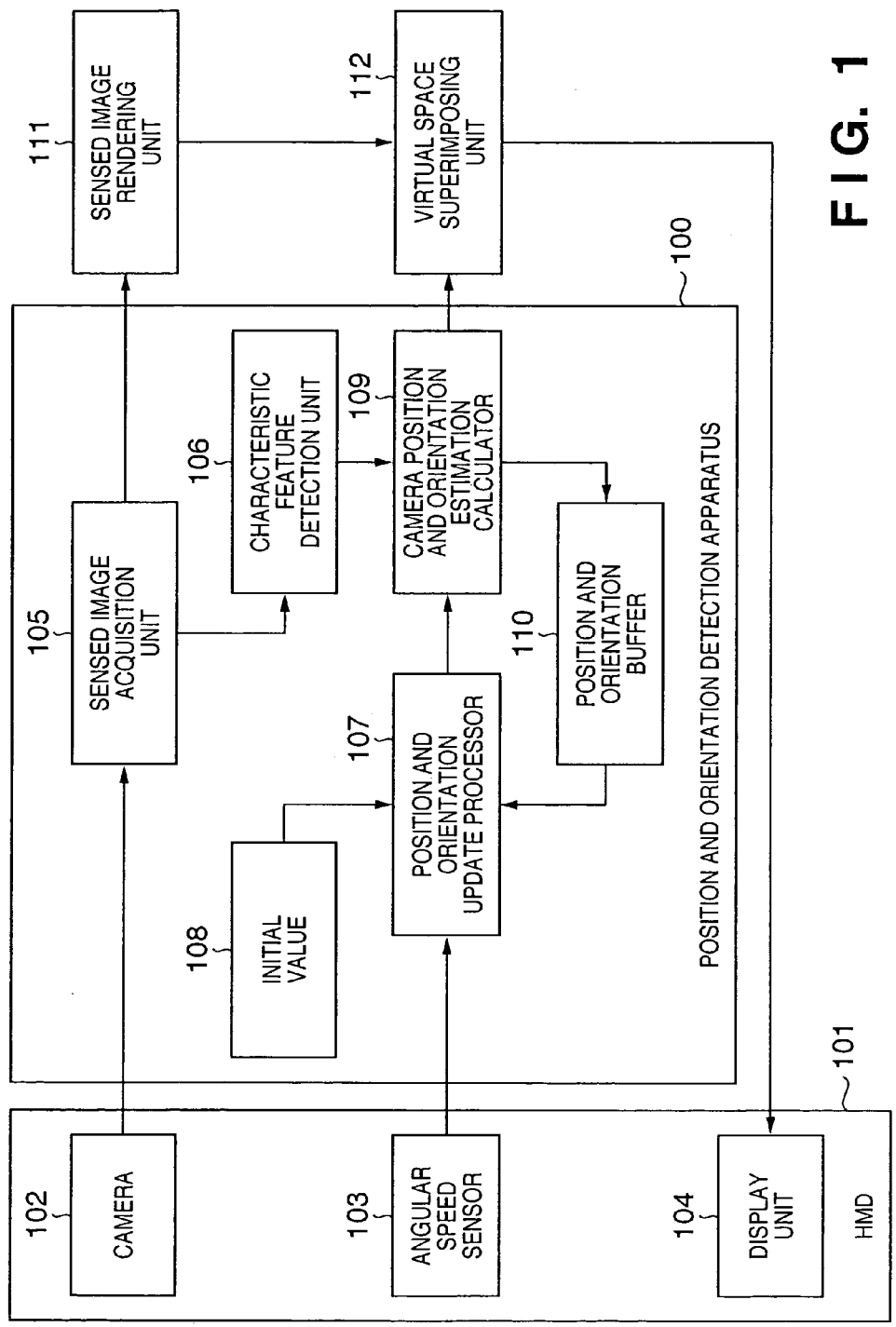
FIG. 1 is a block diagram showing the functional configuration of a system having a position and orientation detector and HMD according to one embodiment of the present invention.

FIG. 1 shows the functional configuration of a case in which a position and orientation detection apparatus 100 according to the present embodiment is adapted to a Head Mounted Display (HMD) 101. The HMD 101 has a camera 102, an angular speed sensor 103 and a display unit 104, and can be moved through real space. The camera 102 senses the real space and outputs signals expressing a sensed image to a sensed image acquisition unit 105. The angular speed sensor 103, based on vibration gyro and other principles, detects the angular speed of movement of the HMD 101. The display unit 104 is a display unit capable of displaying an image, and is typically constructed of two display units, one for the right eye and one for the left eye.

It should be noted that although the present embodiment employs a HMD 101 of which the positions of each of the camera 102, the angular speed sensor 103 and the display unit 104 are fixed, provided that the positions of the camera 102 and the angular speed sensor 103 are fixed in relation to each other and can move through real space, the display unit 104 need not be fixed in relation to the camera 102 and the angular speed sensor 103, and need not be built into the HMD 101.

The sensed image acquisition unit 105, which receives signals transmitted from the camera 102 and generates image data. The image data thus obtained is sent to a characteristic feature detection unit 106 as well as to a sensed image rendering unit 111. The characteristic feature detection unit 106 is adapted to detect indicators (which may be previously arranged markers, or characteristic features such as buildings or some other distinctive topographical feature) in real space that are included in the image data input from the sensed image acquisition unit 105. At this time, the position of the indicator in the image (that is, the 2-dimensional coordinates of the indicator within the image) is also detected.

A position and orientation update processor 107 updates (information expressing) position and orientation by computing the extent of a change in orientation from angular speed signals from the angular speed sensor 103 and an elapsed time obtained, for example, by time processing using a clock signal inside the apparatus and simply adding this extent of change to a camera position and orientation initial value 108 or to a past value stored in a position and orientation buffer 110. Based on the position and orientation of the camera obtained by the position and orientation update processor 107, a camera position and orientation estimation calculator 109 projects a 3-dimensional position of the indicator in real space onto the image display and estimates the position and orientation of the camera based on the superimposed points of the indicator on the image thus obtained and the position of detection on the image display of the indictor as obtained by the characteristic feature detection unit 106. A detailed description of the estimation process is given later.

The position and orientation of the camera obtained by the camera position and orientation estimation calculator 109 is held in the position and orientation buffer 110 and also sent to a virtual space superimposing unit 112. The position and orientation buffer 110 is the buffer that stores the position and orientation of the camera obtained by the camera position and orientation estimation calculator 109, and the position and orientation so stored is used by the position and orientation update processor 107 as described above.

The sensed image rendering unit 111 and the virtual space mixed rendering unit 112 are examples of apparatuses that use the position and orientation of the camera output by the position and orientation detection apparatus 100 according to the present embodiment, and are compositional elements unrelated to position and orientation detection.

The sensed image rendering unit 111, like the characteristic feature detection unit 106, takes image data obtained by the sensed image acquisition unit 105 and renders this image data, which is the result of sensing real space, to a display buffer (not shown) of the display unit 104.

The virtual space superimposing unit 112 carries out mixed rendering of virtual space by rewrite rendering of virtual space (a virtual object image) to the buffer rendered by the sensed image rendering unit 111 and the same display buffer. More specifically, the virtual space superimposing unit 112 combines real space (a real space image) sensed by the camera 102 and virtual space (a virtual object image) generated by rendering a predetermined virtual space model based on the camera position and orientation obtained by the camera position and orientation estimation calculator 109.

The virtual space superimposing unit 112 transmits the contents of the display buffer to the display unit 104 built into the HMD 101, so that the mixed rendering results are displayed on the display unit 104.

Provided that video signals from the HMD 101 camera 102 and detection signals from the angular speed sensor 103 can be received, the position and orientation detection apparatus 100 having the above-described configuration can be placed in any location without regard to the range through which the HMD 101 moves, and thus is very different from the separate apparatus required when using a 6-DOF sensor.

Figure 2:
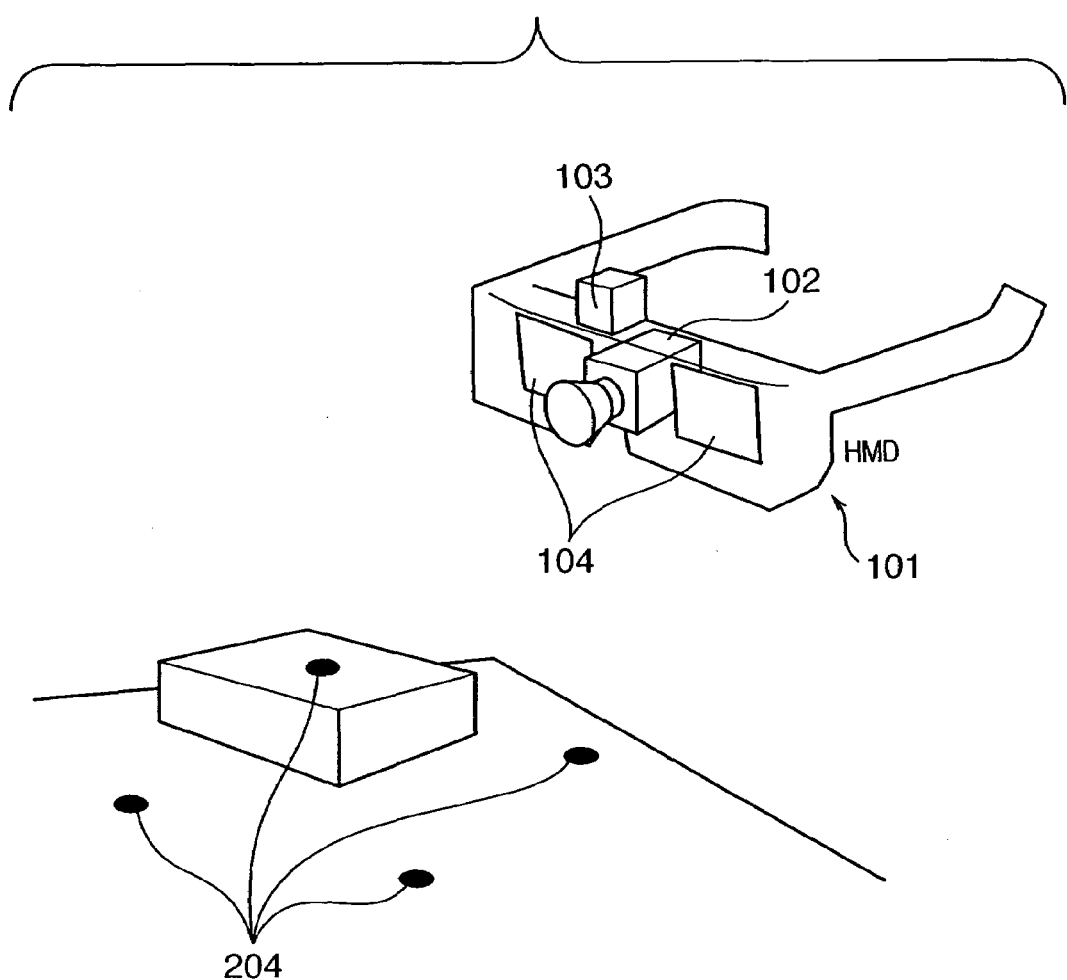
FIG. 2 is a schematic diagram showing a usage state of the system in FIG. 1.

FIG. 2 is a schematic diagram showing a use environment of the HMD 101 according to the present embodiment shown in FIG. 1. As shown in the diagram, the camera 102 is built into the HMD 101, the angular speed sensor 103 is mounted on the HMD 101 and, further, the display unit 104 is built into the HMD 101. This HMD 101 can move freely through real space, and markers 204 that serve as indicators are arranged in the real space that is the target of observation. It should be noted that as described above, the indicators are points whose positioning in three dimensions (3-dimensional positions) in real space are known, and further, are distinctive enough to be detectable by the characteristic feature detection unit 106 from an image in which the indicators are sensed.

In order to make the indicators distinctive enough to be detectable, for example, the shape and color of the markers 204, or their surface area, can be set so as to be detectable by the characteristic feature detection unit 106 from an image in which the indicators are sensed.

Figure 3:
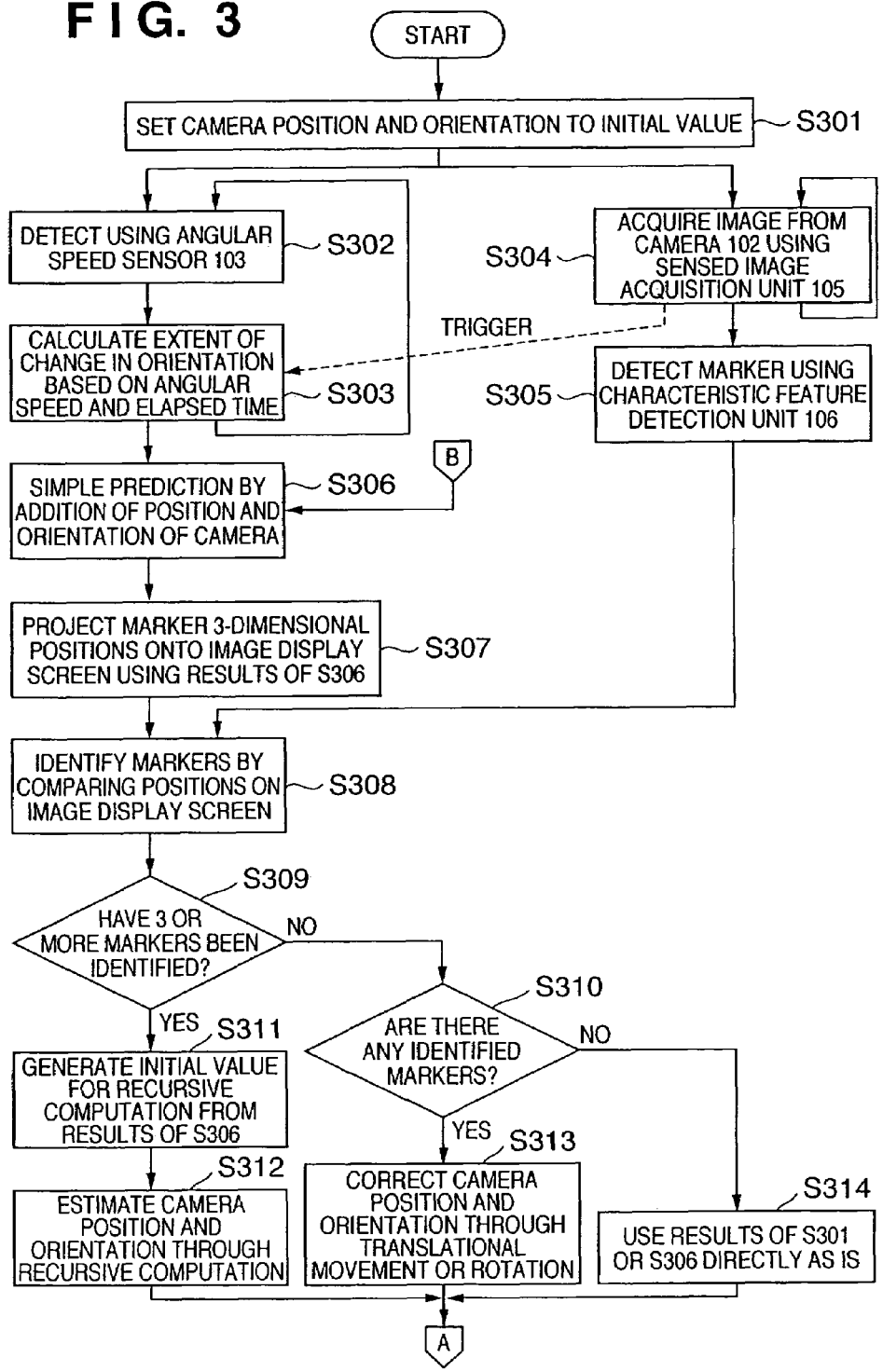
FIG. 3 is a flow chart illustrating position detection performed by the position and orientation detector according to one embodiment of the present invention.
Figure 4:
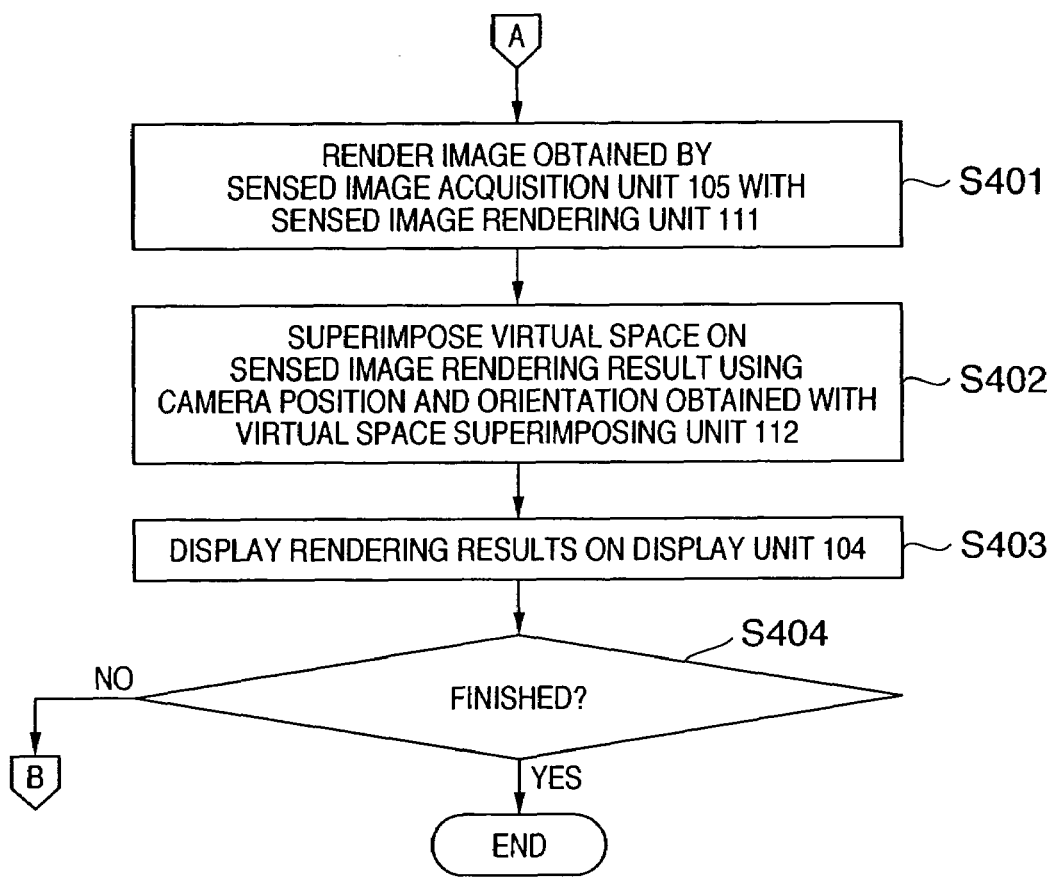
FIG. 4 is a flow chart illustrating position detection performed by the position and orientation detector according to one embodiment of the present invention according to one embodiment of the present invention.

Next, a description is given of the processing carried out by the position and orientation detection apparatus 100 having the above-described configuration, with reference to the flow charts shown in FIG. 3 and FIG. 4. FIGS. 3 and 4 are flow charts of the main processing of the present embodiment. These two diagrams are divided into two sheets of paper simply for the sake of convenience, and are really a single flow chart as shown connected by the flow chart connector.

First, in a step S301, an initial position and orientation of the camera is set. The initial position and orientation of the camera is an initial value of the position and orientation of the camera used in succeeding steps in the process, and expresses the approximate position and orientation of the camera at the time of implementation of the present embodiment.

As an initial position and orientation that can be used in step S301, for example, on the assumption that the position and orientation of the camera when the apparatus is first engaged will not change greatly, it is possible to use a value stored as a predetermined constant. Here, the initial value for the position and orientation of the camera, which is the camera position and orientation initial value 108, is set as the position and orientation of the camera.

Alternatively, instead of using a constant, it is possible to use a position and orientation of the camera estimated using the features of an image sensed by a camera (the camera 102), the camera being the position and orientation detection target. In this case, a marker that makes it possible to estimate the 6-DOF of the position and orientation of the camera (that is, a marker for setting the initial position and orientation) can be used in addition to and separate from the markers 204 in FIG. 2 but placed near the markers 204. Then, processing begins in a state in which the camera is set so that the marker for setting the initial position and orientation is sensed, and the position and orientation of the camera is estimated from the marker for setting the initial position and orientation sensed by the camera and used as the initial position and orientation and in step S301.

Next, steps S302 and S304 are executed in parallel. Step S302 is a step that is continuously executed in tandem with a step S303 to be described later, and step S304 is a step continuously executed by this step alone. Before describing steps S302 and S303, in order to describe the processes carried out in these steps a description is first given of step S304.

At step S304, a process of acquiring video from the camera 102 is executed using the sensed image acquisition unit 105. The camera 102 continues to sense images of continuous frames over a continuous period of time. The acquisition step involves acquiring a signal of a single page of an image at a particular moment in time within the continuous frames. When the entire image at a particular instant has been acquired, a trigger is generated that indicates that acquisition of an image to be used in the step S303 to be described below is finished. In addition, the acquired image data is used in the process carried out in a step S305. The processing of step S304 is repeated in order to acquire the next frame immediately after finishing acquisition of a single display screen's worth of an image. In other words, step S304 continuously acquires image data from the camera and generates a trigger when a page of image data has been acquired.

When acquisition of a page of image data is finished in step S304, the process next moves to the execution of step S305. In step S305, based on the obtained image, the characteristic feature detection unit 106 detects the markers designated 204 from that image. For the sake of the following description, the positions of the detection points of the markers on the obtained image are expressed as $V_i$ (where i=1, 2, ...).

In step S302, detection of angular speed is carried out using the angular speed sensor 103. Next, in step S303, the angular speed detected in step S302 is added to the elapsed time. After the process of step S303 is finished, the process of step S302 is carried out immediately and the angular speed is again detected. Here, the elapsed time is the interval at which the adding process in step S303 is carried out, and is a tiny time period that adds together the detection of step S302 and the computation time of step S303. These two steps can be made to operate in synch with a clock that uniformly counts tiny amounts of time, and that clock interval can be used as the elapsed time. Such a clock may be generated by using a clock output by a clock generator ordinarily used for running computer devices.

Thus, steps S302 and S303 are executed repeatedly (recursively), and the angular speed calculated in step S302 is from time to time added up in step S303. However, step S303 does not simply continue adding but, using the trigger generated at step S304 after acquiring a page of an image, transfers the sum of the addition at the time that trigger is received to a step S306, and the sum value is reset to 0.

In step S306, when the data transferred from step S303 is received, that is, when the trigger of step S304 is received as input at step S303 and a sum value is output, the sum value of the angular speed obtained in step S303 is added to the position and orientation of the camera stored at that time to calculate a new camera position and orientation. Here, the camera position and orientation used when commencing operation and executing step S306 for the first time is the initial value of the position and orientation of the camera set in step S301. As is described later, after completing the following steps, this step S306 is executed once again, at which stage the position and orientation of the camera is calculated by steps to be described below.

In a step S307, using the camera position and orientation obtained in step S306, the 3-dimensional positions of the markers 204 disposed within a scene (real space) sensed at that position and orientation are projected onto the 2-dimensional positions on the image display screen obtained by the camera. This superimposition can be calculated from two processes, or steps: A viewing transformation step that converts the coordinates of the markers disposed within the scene within a global coordinate system into a camera coordinate system, that is, to coordinate values in a 3-dimensional coordinate system that takes the position of the camera as the origin and whose axes change orientation depending on the orientation of the camera; and a see-through projection conversion step that superimposes the coordinates of the camera coordinate system onto the image display screen. A detailed description of the method follows.

First, if a 3-dimensional vector expressing the position of the camera is $t_{ConW}$ and a 3×3 rotational transformation matrix that expresses orientation is $R_{ConW}$, then the transformation equation for converting a point $X_C = [x_C\ y_C\ z_C]$ in the camera coordinate system into a point $X_W = [x_W\ y_W\ z_W]$ in the global coordinate system (FIG. 1) can be expressed as:

$$\begin{bmatrix} x_w \\ y_w \\ z_w \\ 1 \end{bmatrix} = M_{ConW} \begin{bmatrix} x_c \\ y_c \\ z_c \\ 1 \end{bmatrix} = \begin{bmatrix} R_{ConW} & t_{ConW} \\ 0 & 1 \end{bmatrix} \begin{bmatrix} x_c \\ y_c \\ z_c \\ 1 \end{bmatrix} \quad (1)$$

Here, if the orientation detection value is expressed as a rotation axis vector $[r_x\ r_y\ r_z](r_x^2+r_y^2+r_z^2=1)$ and a rotation angle $r_a$, it can be calculated as:

$$R_{conW} = \begin{bmatrix} r_x^2(1-\cos r_a)+\cos r_a & r_x r_y(1-\cos r_a)-r_z\sin r_a & r_z r_x(1-\cos r_a)+r_y\sin r_a \\ r_x r_y 1-\cos r_a)+r_z\sin r_a & r_y^2(1-\cos r_a)+\cos r_a & r_y r_z(1-\cos r_a)-r_x\sin r_a \\ r_z r_x(1-\cos r_a)-r_y\sin r_a & r_y r_z(1-\cos r_a)+r_x\sin r_a & r_z^2(1-\cos r_a)+\cos r_a \end{bmatrix} \quad (2)$$

A viewing transformation is a transformation that corresponds to the inverse transformation of the coordinate transformation expressed by equation (1). In other words, the transformation from point $X_w = [x_w\ y_w\ z_w]$ in the global coordinate system to point $X_c = [x_c\ y_c\ z_c]$ in the camera coordinate system is expressed as:

$$\begin{bmatrix} x_c \\ y_c \\ z_c \\ 1 \end{bmatrix} = M_{WonC} \begin{bmatrix} x_w \\ y_w \\ z_w \\ 1 \end{bmatrix} = M_{conW}^{-1} \begin{bmatrix} x_w \\ y_w \\ z_w \\ 1 \end{bmatrix} \quad (3)$$

Here, to aid in the description of the steps discussed below:

$$M_{ConW}^{-1} = M_{WonC} = \begin{bmatrix} R & t \\ 0 & 1 \end{bmatrix}$$

where the rotation component of $M_{conW}^{-1}$ is R and the translational movement component is t. Accordingly:

$$X_c = RX_w + t \quad (4)$$

As an aside, this R and t are not the camera position and orientation detection values themselves (they are the inverse transformation of the rotation component and the translational movement component). As the $X_w$ of equation (4), the camera coordinate system coordinates can be calculated from the markers' global coordinate system coordinates using the positions of the markers.

Next, a point in the camera coordinate system is converted into a see-through projection onto the image display screen. If the coordinates of the 2-dimensional point to be superimposed on the image display screen are $U=[u_x\ u_y]^t$, then the transformation can be calculated using the following equation $$u_x = f_x \frac{x_c}{z_c},\ u_y = f_y \frac{y_c}{z_c} \quad (5)$$

Here, $f_x$ and $f_y$ are the focal lengths of the camera in the direction of the x-axis and in the direction of the y-axis, respectively. Physically, there is only one value for the focal length of a camera, but here, in order to express the aspect ratio along the x-axis and y-axis simultaneously, the focal length is expressed as two values. In addition, the focal length is a value unique to the camera, and is considered to have been obtained previously.

If the see-through superimposition transformation equation (5) is expressed as $$(u_x, u_y) = P(x_c, y_c, z_c)$$

$$U = P(X_c) \quad (6)$$

then, from equations (4) and (6), an equation by which a point in the global coordinate system is converted into a point on the image display screen can be expressed as $$U = P(RX_W + t) \quad (7)$$

In other words, the computations for superimposing the 3-dimensional positions of the markers onto the image display screen carried out in step S307 involve a process of treating the coordinates of the markers on the global coordinate system as $X_W$ and computing a position U on the image display screen using equation (7).

Next, in a step S308, the superimposed positions of the markers on the image display screen obtained in step S307 and the positions of the markers in the image being obtained in step S305 are compared, and those pairs of markers that are sufficiently close to each other on the image display screen are identified as the same marker.

In a step S309, as one example of determining whether there is enough correctable data for all 6 DOF of the position and orientation of the camera obtained in step S306, it is determined whether or not there are three or more markers (three pairs) that have been identified in step S308 as being the same. In the event that there are three or more such points, then processing proceeds to a step S311. By contrast, if there are two or fewer such points then processing proceeds to a step S310. That is, in step S310 a determination is made as to whether or not any more identified markers exist. If more identified markers do exist, then processing proceeds to a step S313. If not, then processing proceeds to a step S314.

Next, a description is given of the processes carried out in steps S311 and S312. In step S311 and S312, camera position and orientation are estimated using three or more identified markers (initial value correction). The rotation component R of equation (4) can be expressed as rotation axis and rotation angle as shown in equation (2), and further, can be expressed in three values by expressing the rotation angle as the length of the rotation axis $((\omega_x, \omega_y, \omega_z) = (r_a r_x, r_a r_y, r_a r_z))$. Here, the 6 DOF parameters, combining the rotation component R and the translational movement component t, are expressed as a vector $S = [\omega_x\ \omega_y\ \omega_z\ t_x\ t_y\ t_z]^t$. By so doing, viewing transformation equation (4), which represents the change in coordinates due to rotation and translational movement within 3-dimensional space, may be expressed as $X_C = T(S, X_W)$, and then that transformation equation (7) that includes superimposed transformation can be expressed as $$Ui = N^-(T(S, X_i)) = F((S, X_i)) \quad (8)$$

By contrast, for the positions of the indicators detected on the image, if the difference between the viewing transformation 6 DOF parameters S obtained based on the 3-dimensional position and orientation detection values and the viewing transformation 6 DOF parameters obtained from what is assumed to be the true camera position and orientation is $\Delta S$ (that is, the true viewing transformation 6 DOF parameters are $S + \Delta S$), then it follows that:

$$Vi = N^-(T(S+\Delta S, X_i)) = F((S+\Delta S, X_i)) \quad (9)$$

If the camera position and orientation obtained in step S306 were to express real values, then $\Delta S$ would be 0, and $U_i$ and $V_i$ would be the same point. However, since the camera position and orientation obtained in step S306 do not represent real values, $U_i$ and $V_i$ are not the same point. Obtaining the position and orientation of the camera involves estimating $\Delta S$ or $S + \Delta S$ based on the error between $U_i$ and $V_i$. In other words, the distance between these two points, that is, the error vector on the image display screen, which may be expressed as $$\Delta U_i = U_i - V_i \quad (10)$$

has a squared error of a length that may be expressed as $$err = \sum_{i=1}^{N} \|\Delta u\|^2 = \sum_{i=1}^{N} \|u_i - v_i\|^2 \quad (11)$$

and may be arranged so that it is possible to obtain the smallest possible $\Delta S$ or $S + \Delta S$. This can be obtained using a recursive computation such as Newton's Method or the like.

The following description pertains to an example that uses Newton's Method.

First, obtain a function by partial differentiation of the right side of equation (8) using $t_x$, $t_y$, $t_z$, $\omega_x$, $\omega_y$, $\omega_z$. The Jacobi matrix obtained by applying the integral of the partial differentiation of equation (8) by the six variables $t_x$, $t_y$, $t_z$, $\omega_x$, $\omega_y$, $\omega_z$ to each element is:

$$J_{us} = \frac{\partial u}{\partial s} = \begin{bmatrix} \frac{\partial u_x}{\partial \omega_x} & \frac{\partial u_x}{\partial \omega_y} & \frac{\partial u_x}{\partial \omega_z} & \frac{\partial u_x}{\partial t_x} & \frac{\partial u_x}{\partial t_y} & \frac{\partial u_x}{\partial t_z} \\ \frac{\partial u_y}{\partial \omega_x} & \frac{\partial u_y}{\partial \omega_y} & \frac{\partial u_y}{\partial \omega_z} & \frac{\partial u_y}{\partial t_x} & \frac{\partial u_y}{\partial t_y} & \frac{\partial u_y}{\partial t_z} \end{bmatrix} \quad (12)$$

The Jacobi matrix from vector a of element j to vector b of element k is the matrix consisting of elements jxk, and is expressed as $J_{ba}$.

If $u_x$ and $u_y$ are then partially differentiated by some variable p, then, from equations (5) and (6):

$$\frac{\partial u_s}{\partial p} = \frac{f_x \frac{\partial x_c}{\partial p} z_c - f_x x_c \frac{\partial z_c}{\partial p}}{z_c^2} = \frac{f_x}{z_c}\left(\frac{\partial x_c}{\partial p} - \frac{x_c}{z_c}\frac{\partial z_c}{\partial p}\right)$$

$$\frac{\partial u_s}{\partial p} = \frac{f_y \frac{\partial y_c}{\partial p_c} z_c - f_y y_c \frac{\partial z_c}{\partial p}}{z_c^2} = \frac{f_y}{z_c}\left(\frac{\partial y_c}{\partial p} - \frac{y_c}{z_c}\frac{\partial z_c}{\partial p}\right)$$

Accordingly, the elements of the three columns on the right side of the matrix in equation (12) become $$\frac{\partial u_x}{\partial t_x} = \frac{\partial u_x}{\partial t_y} = \frac{\partial u_x}{\partial t_z} = \frac{f_x}{z_c}\left(1 - \frac{x_c}{z_c}\right) \quad (13)$$

$$\frac{\partial u_y}{\partial t_x} = \frac{\partial u_y}{\partial t_y} = \frac{\partial u_y}{\partial t_z} = \frac{f_y}{z_c}\left(1 - \frac{y_c}{z_c}\right),$$

and can be obtained from the focal length and the positions of the indicators in the camera coordinate system.

Similarly, the elements of the three columns on the left side of the matrix in equation (12) become:

$$\frac{\partial u_x}{\partial \omega_x} = \frac{f_x}{z_c}\left(\frac{\partial x_c}{\partial \omega_x} - \frac{x_c}{z_c}\frac{\partial z_c}{\partial \omega_x}\right), \frac{\partial u_x}{\partial \omega_y} = \frac{f_x}{z_c}\left(\frac{\partial x_c}{\partial \omega_y} - \frac{x_c}{z_c}\frac{\partial z_c}{\partial \omega_y}\right), \quad (14)$$

$$\frac{\partial u_x}{\partial \omega_x} = \frac{f_x}{z_c}\left(\frac{\partial x_c}{\partial \omega_z} - \frac{x_c}{z_c}\frac{\partial z_c}{\partial \omega_z}\right),$$

$$\frac{\partial u_y}{\partial \omega_x} = \frac{f_y}{z_c}\left(\frac{\partial y_c}{\partial \omega_x} - \frac{y_c}{z_c}\frac{\partial z_c}{\partial \omega_x}\right), \frac{\partial u_y}{\partial \omega_y} = \frac{f_y}{z_c}\left(\frac{\partial y_c}{\partial \omega_y} - \frac{y_c}{z_c}\frac{\partial z_c}{\partial \omega_y}\right),$$

$$\frac{\partial u_y}{\partial \omega_z} = \frac{f_y}{z_c}\left(\frac{\partial y_c}{\partial \omega_z} - \frac{y_c}{z_c}\frac{\partial z_c}{\partial \omega_z}\right),$$

Here, $$\frac{\partial x_c}{\partial \omega_x}, \frac{\partial x_c}{\partial \omega_y}, \frac{\partial x_c}{\partial \omega_z}, \frac{\partial y_c}{\partial \omega_x}, \frac{\partial y_c}{\partial \omega_y}, \frac{\partial y_c}{\partial \omega_y}, \frac{\partial z_c}{\partial \omega_x}, \frac{\partial z_c}{\partial \omega_y}, \frac{\partial z_c}{\partial \omega_z}$$

The foregoing, though not described in detail, can be obtained from the positions of the indicators in the global coordinate system and the rotation axis rotation angle. Thus equation (14), in other words, the elements of the three columns on the left side of the matrix in equation (12), can be obtained from the positions of the indicators in the global coordinate system and the rotation axis rotation angle.

Further, it follows from equation (12) that:

$$\partial u = \frac{\partial u}{\partial s}\partial s \quad (15)$$

$$\partial u = J_{us}\partial s$$

Equation (15) means that tiny changes in U for tiny changes in S can be calculated using the $J_{us}$ obtained from the value for S at that time. From this it follows that, when $\Delta S$ is small, the actual extent of error $\Delta U$ and $\Delta S$ is:

$$\Delta u \approx J_{us}\Delta s \quad (16)$$

Here, the number of point(s) (indicators) used in this correction computation is n, ($n \geq 3$). Equation (16) applies for each and every point, so using a vector that vertically aligns the vectors of n points yields:

$$\begin{bmatrix} \Delta u_1 \\ \Delta u_2 \\ \vdots \\ \Delta u_n \end{bmatrix} \approx \begin{bmatrix} J_{us1} \\ J_{us2} \\ \vdots \\ J_{usn} \end{bmatrix} \Delta s \quad (17)$$

If the terms $[\Delta U_1\ \Delta U_2 \ldots \Delta U_n]$ and $[J_{us1}\ J_{us2} \ldots J_{usn}]$ in equation (17) are each set as $$\Psi = \begin{bmatrix} \Delta u_1 \\ \Delta u_2 \\ \vdots \\ \Delta u_n \end{bmatrix}, \Phi = \begin{bmatrix} J_{us1} \\ J_{us2} \\ \vdots \\ J_{usn} \end{bmatrix} \quad (18)$$

then, using the generalized inverse matrix (pseudo inverse matrix) $\Phi$, the $\Delta S$ that attains the minimum error with the same weight for all points can be obtained as follows:

$$\Delta s \approx (\Phi\Phi^t)^{-1}\Phi\Psi \quad (19)$$

This corresponds to the process of computing a succeeding S when using Newton's Method to obtain S when S is in a certain state. In other words, it can be applied as a computation of one part of a process of optimization carried out by repeating Newton's Method. That is, when there is a certain initial value $S_0$, from the invariant positions $x_1, x_2 \ldots x_n$ of the indicators within the global coordinate system and from the error vectors $\Delta U_1\ \Delta U_2 \ldots \Delta U_n$, equation (19) can be used to obtained $\Delta S$.

Using these results, $S_1 = S_0 + \Delta S$, $[\Delta U_1\ \Delta U_2 \ldots \Delta U_n]$ is recalculated and equation (19) is used once again to obtain $\Delta S$. This result is further used so that $S_2 = S_1 + \Delta S$ and the same process of computation is repeated until $[\Delta U_1\ \Delta U_2 \ldots \Delta U_n]$ approaches 0 or the difference between $S_{k-1}$ and $S_k$ virtually disappears when the process is repeated k times. By this recursive process, the camera viewing transformation 6 DOF parameters at which error between the positions at which the indicators are superimposed upon the image display screen and the positions at which the indicators are actually detected is minimized and can be obtained as $S_k$.

In step S311, a process of setting the camera position and orientation obtained in step S306 is carried out in order to provide the initial value necessary for the above-described recursive computation. The process of carrying out the recursive computation described above based on this value constitutes step S312.

It should be noted that any recursive computation may be used as the method of obtaining the S at which the error (err) of equation (11) is smallest, and thus there is no requirement that only Newton's Method be used. For example, it is known that the Levenberg-Marquardt (LM) Method or the Simplex Method can be used.

The foregoing describes the camera position and orientation estimation method performed in step S311 and step S312. Next, a description is given of a case in which the determination is NO in step S309 and the determination is YES in step S310, that is, a case in which there are only one or two markers that can be used and processing proceeds to step S313. In such a case, because the number of usable markers is small, the position and orientation of the camera at which all 6 DOF are optimal, that is, the camera position and orientation is optimal, cannot be estimated.

Accordingly, a process of correcting only either camera position 3 DOF (degree of freedom in the direction of rotation about the coordinate axes) or the camera position (degree of freedom in the translational direction of advance along the coordinate axes) is executed. In the event that there is only one usable marker, a method is used that corrects the orientation or position so that that point matches perfectly. If there are two usable markers, then a method is used that uses an average correction extent so that both points match perfectly.

Next, a description is given of a case in which the determination made in step S310 is NO and processing proceeds to step S314. In step S314, because it is not possible to estimate and correct the position and orientation of the camera using markers, the camera position and orientation obtained in step S306 is taken directly as the present camera position and orientation.

No matter which of step S312, step S313 and step S314 has been carried out in the process so far, processing proceeds from these steps to a step S401 in FIG. 4. In step S401, the image acquired by the sensed image acquisition unit 105 in step S304 is rendered using the sensed image rendering unit 111. Next, in a step S402, using the camera position and orientation obtained by any of the methods of either step S312, step S313 or step S314, the virtual space superimposing unit 112 superimposes (renders by writing over) the virtual space (that is, the image of the virtual object) onto the sensed image rendering results to obtain a mixed rendering of real space and virtual space.

In a step S403, the mixed rendering results thus obtained are displayed on the display unit 104, thus enabling an observer to observe a mixed image combining real space and virtual space. Thereafter, in a step S404, it is determined whether or not to end all processing.

If processing is to be ended, then the processes of steps S302 and S303, as well as the process of step S304, are ended, ending all steps. If processing is not ended, that is, if the camera position and orientation are to continue to be detected and a mixed image displayed, then processing proceeds to step S306. In step S306, as described above, the camera position and orientation obtained by any of the methods of steps S312, S313 and S314 are used to carry out processing based on the camera position and orientation obtained at the time that process is carried out.

(Other Embodiments)

The foregoing embodiment has been described with reference only to a case in which the position and orientation detection apparatus according to the present invention is adapted to the detection of the position and orientation of a camera mounted on a HMD. However, the position and orientation detection apparatus of the present invention can also be adapted to the detection of the position and orientation of any other image sensing apparatus.

In addition, although the foregoing embodiment has been described with reference to an instance using angular speed sensors to detect the orientation of the image sensing apparatus that is the target of detection, the present invention is not limited to the use of angular speed sensors. Provided that data that enables an estimate to be made of the present position and orientation to be made from a previously obtained position and orientation can be obtained, the signals of any sensor other than a 6 DOF sensor may be used instead.

Although the foregoing embodiment has been described in terms of a position and orientation detection apparatus comprised of a single device, the present invention is not limited to such an arrangement and the same effects can be obtained from an arrangement comprising multiple devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As described above, according to the present invention, because it does not use a 6-DOF sensor, the detection range, installation and cost problems associated with the 6-DOF sensor can be solved. In addition, because the present invention detects the extent of change in the orientation of the camera, the indicator detection instability associated with methods that estimate position and orientation solely from the image obtained by the camera does not arise. Further, the camera position and orientation detection results do not stop at just indicator detection position prediction but can also be used directly in detecting the position and orientation of the camera. Moreover, there is no need to carry out predictive computations of the position and orientation at precise intervals as with methods that use an extended Kalman filter, making it possible to detect the position and orientation of the camera.

As many apparently widely different embodiments of the present invention can be made without departing from the spirit and scope thereof, it is to be understood that the inven-

What is claimed is:

1. A position and orientation detection method of detecting a position and orientation of an image sensing apparatus that senses real space, the method comprising:

an orientation change detection step of detecting an extent of change in orientation of the image sensing apparatus;

a first image coordinates computation step of obtaining coordinates in an image of indicators included in a real space image sensed by the image sensing apparatus;

a position and orientation estimation step of estimating a present position and orientation of the image sensing apparatus based on position and orientation of the image sensing apparatus obtained previously and the extent of change in orientation of the image sensing apparatus obtained in the orientation change detection step;

a second image coordinates computation step of obtaining coordinates of indicators in a sensed image display screen of the image sensing apparatus at the position and orientation obtained in the position and orientation estimation step;

an identification step of identifying corresponding pairs of indicators from among the indicators obtained in the first and second image coordinates computation step;

a counting step of counting a number of the pairs of indicators identified in the identification step;

a selection step of selecting a first correction method if the number of the identified pairs of indicators is more than or equal to a predetermined number, and selecting a second correction method if the number of the identified pairs of indicators is less than the predetermined number;

a position and orientation correction step of correcting the position and orientation estimated in the position and orientation estimation step using the correction method selected in the selection step.

2. The position and orientation detection method according to claim 1, wherein the first correction method corrects the position and orientation estimated in the position and orientation estimation step so that a distance between the identified indicator pairs becomes minimal.

3. The position and orientation detection method according to claim 1, wherein the second correction method corrects the position and orientation estimated in the position and orientation estimation step based on correcting so that at least one of the identified indicator pairs matches.

4. The position and orientation detection method according to claim 1, wherein in the position and orientation correction step, the position and orientation estimated in the position and orientation estimation step are taken directly as post-correction position and orientation in a case in which there are no identified indicator pairs.

5. A program stored on a computer-readable medium for causing a computer to execute the steps of the position and orientation detection method of claim 1.

6. A position and orientation detection apparatus for detecting a position and orientation of an image sensing apparatus that senses real space, the apparatus comprising:

an orientation change detection unit adapted to detect an extent of change in orientation of the image sensing apparatus;

a first image coordinates computation unit adapted to obtain coordinates in an image of indicators includes in a real space image sensed by the image sensing apparatus;

a position and orientation estimation unit adapted to estimate a present position and orientation of the image sensing apparatus based on position and orientation of the image sensing apparatus obtained previously and the extent of change in orientation of the image sensing apparatus obtained by the orientation change detection unit;

a second image coordinates computation unit adapted to obtain coordinates of indicators in a sensed image display screen of the image sensing apparatus at the position and orientation obtained by the position and orientation estimation unit;

an identification unit for identifying corresponding pairs of indicators from among the indicators obtained by the first and second image coordinates computation units;

a counting unit for counting a number of the pairs of indicators identified by the identification unit;

a selection unit for selecting a first correction method if the number of the identified pairs of indicators is more than or equal to a predetermined number, and selecting a second correction method if the number of the identified pairs of indicators is less than the predetermined number; and a position and orientation correction unit adapted to correct the position and orientation estimated by the position and orientation estimation unit using the correction method selected by the selection unit.

* * * * *